(12) United States Patent
Izawa et al.

(10) Patent No.: US 8,718,016 B2
(45) Date of Patent: May 6, 2014

(54) MOBILE COMMUNICATION SYSTEM, BASE STATION, AND HANDOVER EXECUTION METHOD

(75) Inventors: Yasunari Izawa, Kawasaki (JP);
Masashi Ohno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 28 days.

(21) Appl. No.: 13/486,052

(22) Filed: Jun. 1, 2012

(65) Prior Publication Data

US 2012/0236827 A1 Sep. 20, 2012

Related U.S. Application Data

(63) Continuation of application No. PCT/JP2009/070490, filed on Dec. 7, 2009.

(51) Int. Cl.
| | | |
|---|---|---|
| H04W 4/00 | (2009.01) | |
| H04W 36/02 | (2009.01) | |
| H04W 40/36 | (2009.01) | |

(52) U.S. Cl.
CPC .............. H04W 36/02 (2013.01); H04W 40/36 (2013.01)
USPC .......................................... 370/331; 455/436

(58) Field of Classification Search
CPC ............................... H04W 36/02; H04W 40/36
USPC .......................................... 370/331; 455/436
See application file for complete search history.

(56) References Cited

U.S. PATENT DOCUMENTS

| | | | |
|---|---|---|---|
| 8,077,671 B2 | 12/2011 | Lee et al. | |
| 2002/0181437 A1 | 12/2002 | Ohkubo et al. | |
| 2003/0185202 A1 * | 10/2003 | Maenpaa | 370/352 |
| 2007/0286125 A1 | 12/2007 | Lee et al. | |
| 2008/0102841 A1 | 5/2008 | Kato | |
| 2008/0176566 A1 | 7/2008 | Akita | |
| 2010/0002629 A1 * | 1/2010 | Moussa | 370/328 |

FOREIGN PATENT DOCUMENTS

| | | |
|---|---|---|
| JP | 2003-324761 | 11/2003 |
| JP | 2007-266790 | 10/2007 |
| JP | 2008-103865 | 5/2008 |
| JP | 2008-118227 | 5/2008 |

OTHER PUBLICATIONS

International Search Report dated Feb. 2, 2010, from corresponding International Application No. PCT/JP2009/070490.

* cited by examiner

*Primary Examiner* — Sai-Ming Chan
(74) *Attorney, Agent, or Firm* — Katten Muchin Rosenman LLP

(57) ABSTRACT

A mobile communication system includes a plurality of base stations, an upper node, and a mobile station. In this mobile communication system, while a first base station that is currently connected via radio to the mobile station is receiving a first downlink signal from a second base station that was previously connected via radio to the mobile station and that received the first downlink signal from the upper node for transmission to the mobile station, when the mobile station is connected via radio to a third base station as a result of a handover, the first base station sends a redirection request signal requesting the second base station to redirect the first downlink signal to the third base station. Then, in response to the redirection request signal, the second base station redirects the first downlink signal to the third base station.

7 Claims, 13 Drawing Sheets

MOBILE COMMUNICATION SYSTEM, BASE STATION, AND HANDOVER EXECUTION METHOD

CROSS-REFERENCE TO RELATED APPLICATION

This application is a continuation application and is based upon PCT/JP2009/070490, filed on Dec. 7, 2009, the entire contents of which are incorporated herein by reference.

FIELD

The embodiments disclosed herein are related to a mobile communication system, a base station, and a handover execution method.

BACKGROUND

In the field of mobile communication systems, the need for higher data transmission speeds is increasing. To address this need, work on communication standards achieving higher communication speeds than High Speed Downlink Packet Access (HSDPA) has been proceeding. One example of a communication standard capable of achieving such high-speed data communications is Long Term Evolution (LTE) on which the Third Generation Partnership Project (3GPP) is working to standardize.

In LTE, some of the functions conventionally incorporated into a radio network controller (RNC) are incorporated into a base station (Evolved Universal Terrestrial Radio Access Network (E-UTRAN) NodeB (eNB)) thereby greatly enhancing the functionality of the base station. In executing a handover, for example, there are instances in which a downlink signal buffered at the source base station (hereinafter referred to as eNB1) with which the mobile station as a user terminal has been communicating via radio until the execution of the handover has not yet been transmitted to the mobile station. If there is any such downlink signal, the eNB1 transfers the downlink signal to another base station (hereinafter referred to as eNB2) to which the mobile station is connected after the execution of the handover. In this case, the eNB2 receives downlink signals not only from the eNB1 but also from an upper node. Of the downlink signals received over the two different paths, the eNB2 first transmits any downlink signal received from the eNB1 to the mobile station in order to preserve the sequence integrity of the data to be delivered to the mobile station. After that, the eNB2 transmits the downlink signal directly received from the upper node to the mobile station (refer, for example, to 3GPP TS 36.300, v8.7.0, Sections 10.1.2.1 and 10.1.2.1.2).

Another technique has been proposed for transmitting such downlink signals to the mobile station when a handover occurs while any such downlink signal is buffered at the base station (refer, for example, to Japanese Laid-open Patent Publication No. 2007-266790). According to this technique, the base station that holds the packets yet to be transmitted to the mobile station transmits some of the packets directly to the mobile station while transferring the other packets to the handover destination base station. Then, these other packets received at the handover destination base station are transmitted to the mobile station.

While the yet-to-be-transmitted downlink signal is being transferred from the eNB1 to the eNB2 due to the execution of the handover, if a new handover occurs, the above process is repeated. As a result, after the data transfer from the eNB1 to the eNB2 is completed, the yet-to-be-transmitted downlink signal is further transferred to still another base station (hereinafter called the eNB3) to which the mobile station is connected after the execution of the new handover. Further, the upper node that first switched the destination of the downlink signal from the eNB1 to the eNB2 next switches the destination from the eNB2 to the eNB3.

SUMMARY

If a plurality of handovers occur in succession, the eNB2 connected via radio to the mobile station by the first handover may have to transfer the downlink signal received from the eNB1 on to the eNB3 that is connected via radio to the mobile station by the second handover. If such data transfer occurs repeatedly among the base stations, a delay may occur in the delivery of the data to the mobile station. Furthermore, transferring the downlink signal to the mobile station via a plurality of base stations increases the possibility of all or part of the downlink signal being lost during the data transfer among the base stations.

According to one embodiment, a mobile communication system is provided. The mobile communication system includes a plurality of base stations, an upper node connected to the plurality of base stations, and a mobile station capable of connecting via radio to any one of the plurality of base stations.

In this mobile communication system, while a first base station of the plurality of base stations that is currently connected via radio to the mobile station is receiving a first downlink signal from a second base station of the plurality of base stations that was previously connected via radio to the mobile station and that received the first downlink signal from the upper node for transmission to the mobile station, when the mobile station is connected via radio to a third base station of the plurality of base stations as a result of a handover, the first base station sends a redirection request signal requesting the second base station to redirect the first downlink signal to the third base station. Then, in response the redirection request signal, the second base station redirects the first downlink signal to the third base station.

According to another embodiment, a base station is provided. The base station includes an interface unit for connecting with another base station, a wireless interface unit for connecting via radio with a mobile station located within a communication coverage area of the base station, and a control unit which, while the base station that is currently connected via radio to the mobile station is receiving a first downlink signal yet to be transmitted to the mobile station from a first other base station that was previously connected via radio to the mobile station, when the mobile station is connected via radio to a second other base station as a result of a handover, then generates a redirection request signal for requesting the first other base station to redirect the first downlink signal to the second other base station, and sends the redirection request signal to the first other base station via the interface unit.

According to still another embodiment, a handover execution method for use in a mobile communication system which includes a plurality of base stations, an upper node connected to the plurality of base stations, and a mobile station capable of connecting via radio to any one of the plurality of base stations is provided.

In this handover execution method, while a first base station of the plurality of base stations that is currently connected via radio to the mobile station is receiving a first downlink signal from a second base station of the plurality of base stations that was previously connected via radio to the mobile station and that received the first downlink signal from the upper node for transmission to the mobile station, when the mobile station is connected via radio to a third base station of the plurality of base stations as a result of a handover, the first base station sends a redirection request signal requesting the second base station to redirect the first downlink signal to the third base station. Then, in response to the redirection request signal, the second base station redirects the first downlink signal to the third base station. The third base station then transmits the first downlink signal to the mobile station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A mobile communication system according to one embodiment will be described below with reference to the drawings.

While a downlink signal is being transferred from a base station that was previously connected via radio to a mobile station to a base station currently connected via radio to the mobile station, a new handover may occur. If this happens, in the mobile communication system disclosed herein, the handover source base station requests the downlink signal transferring base station to switch the destination of the downlink signal to a new handover destination base station. In response, the signal transferring base station transfers the buffered downlink signal directly to the new handover destination base station. In this way, the mobile communication system reduces the number of downlink signal transfers among the base stations.

Figure 1:
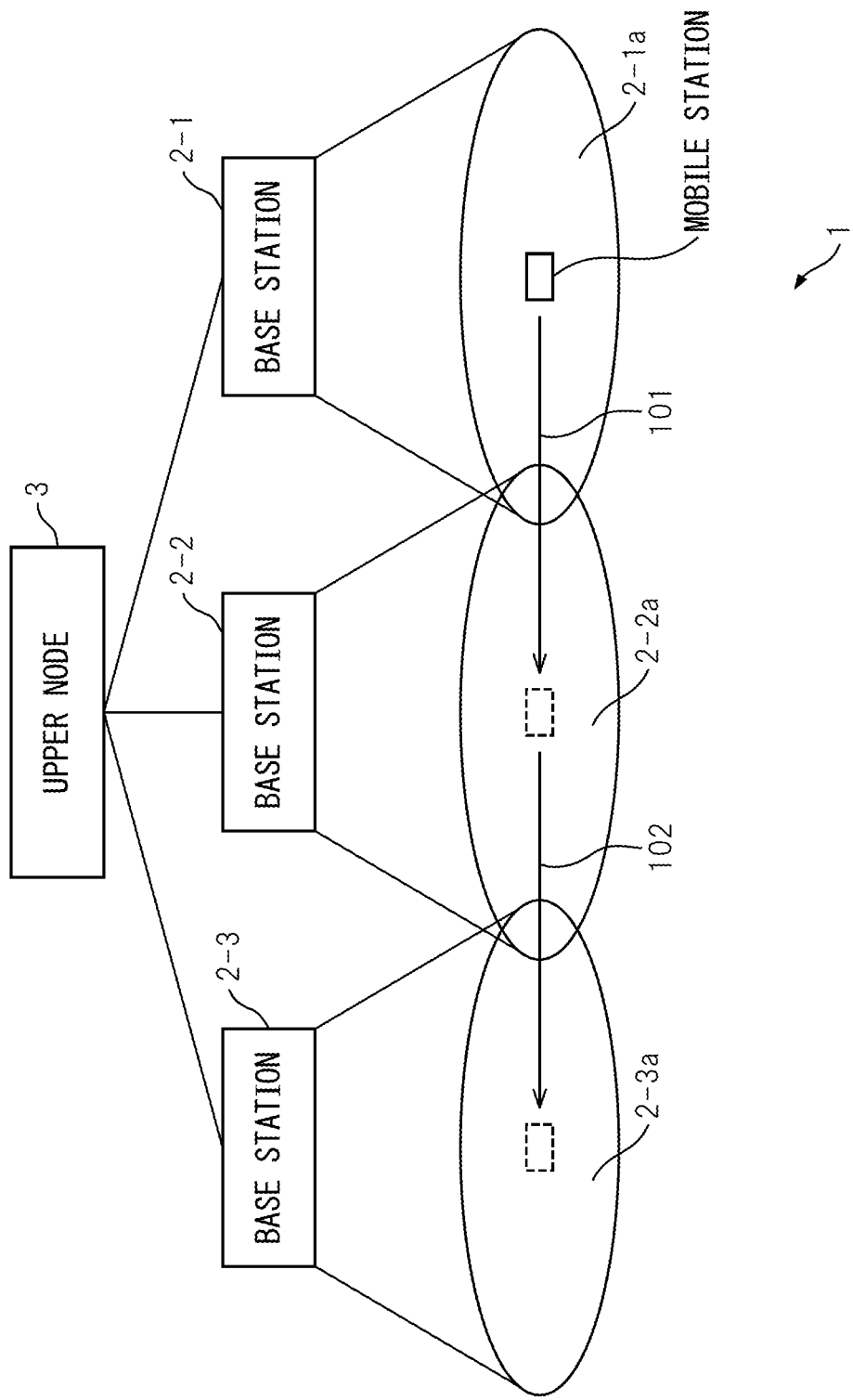
FIG. 1 is a diagram schematically illustrating the configuration of a mobile communication system according to one embodiment.

FIG. 1 is a diagram schematically illustrating the configuration of the mobile communication system according to the one embodiment. The mobile communication system 1 includes a plurality of base stations 2-1 to 2-3, an upper node 3, and a mobile station 4. The base stations 2-1 to 2-3 are each connected to the upper node 3 over a communication network. As an example, in FIG. 1, the mobile communication system 1 is depicted as including three base stations. However, the number of base stations in the mobile communication system 1 is not limited to three. Further, the number of mobile stations in the mobile communication system 1 is not limited to one.

The base stations 2-1 to 2-3 are apparatuses that relay communications between the mobile station 4 and the upper node 3. The base stations 2-1 to 2-3 each correspond, for example, to an eNB in LTE.

The upper node 3 is an apparatus that relays communications between the mobile station 4 and a core network. The upper node 3 corresponds, for example, to a serving gateway (S-GW) in LTE. The upper node 3 may include the function of Mobility Management Entity (MME), or may include an apparatus having the function of S-GW and an apparatus having the function of MME as separate entities.

When the mobile station 4 enters any one of the communication areas 2-1a to 2-3a of the base stations 2-1 to 2-3, the mobile station 4 can communicate via radio with the base station serving that communication area. When a radio link is established between the mobile station 4 and the serving base station, an uplink signal transmitted from the mobile station 4 is relayed via the base station on to the upper node 3. The upper node 3 routs and transmits the received uplink signal, for example, over the core network, to another upper node (not depicted). On the other hand, when a downlink signal is received from that other upper node over the core network, the upper node 3 transmits the received downlink signal to the mobile station 4 via the base station to which the mobile station 4 is linked via radio.

For example, suppose that the mobile station 4 is initially located in the communication area 2-1a of the base station 2-1 and is linked via radio to the base station 2-1. In this case, the downlink signal is transmitted from the upper node 3 to the base station 2-1 and is buffered at the base station 2-1. Then, the downlink signal is transmitted from the base station 2-1 to the mobile station 4. Suppose that the mobile station 4 moves into the communication area 2-2a of the base station 2-2, as indicated by arrow 101. In this case, a handover occurs. As a result, any data, of the downlink signal buffered at the base station 2-1, that has yet to be transmitted to the mobile station 4 is transferred from the base station 2-1 to the base station 2-2. Then, the data that has yet to be transmitted is transmitted from the base station 2-2 to the mobile station 4. Suppose here that the mobile station 4 moves from the communication area 2-2a of the base station 2-2 to the communication area 2-2a of the base station 2-3, as indicated by arrow 102, before the data transfer from the base station 2-1 to the base station 2-2 is completed. In this case, the base station 2-2 requests the base station 2-1 to switch the data transfer destination to the base station 2-3. In response, the base station 2-1 transfers the remaining data directly to the base station 2-3. Further, if there is any data yet to be transmitted to the mobile station 4 among the downlink signals received from the upper node 3 and buffered in the storage unit of the base station 2-2, the base station 2-2 transfers the yet-to-be-transmitted data to the base station 2-3. The base station 2-3 that received the yet-to-be-transmitted data from the respective base stations 2-1 and 2-2 reorders the sequence of the data so that the data will be transmitted in the correct order. Then, the base station 2-3 transmits the yet-to-be-transmitted data to the mobile station 4.

Figure 2:
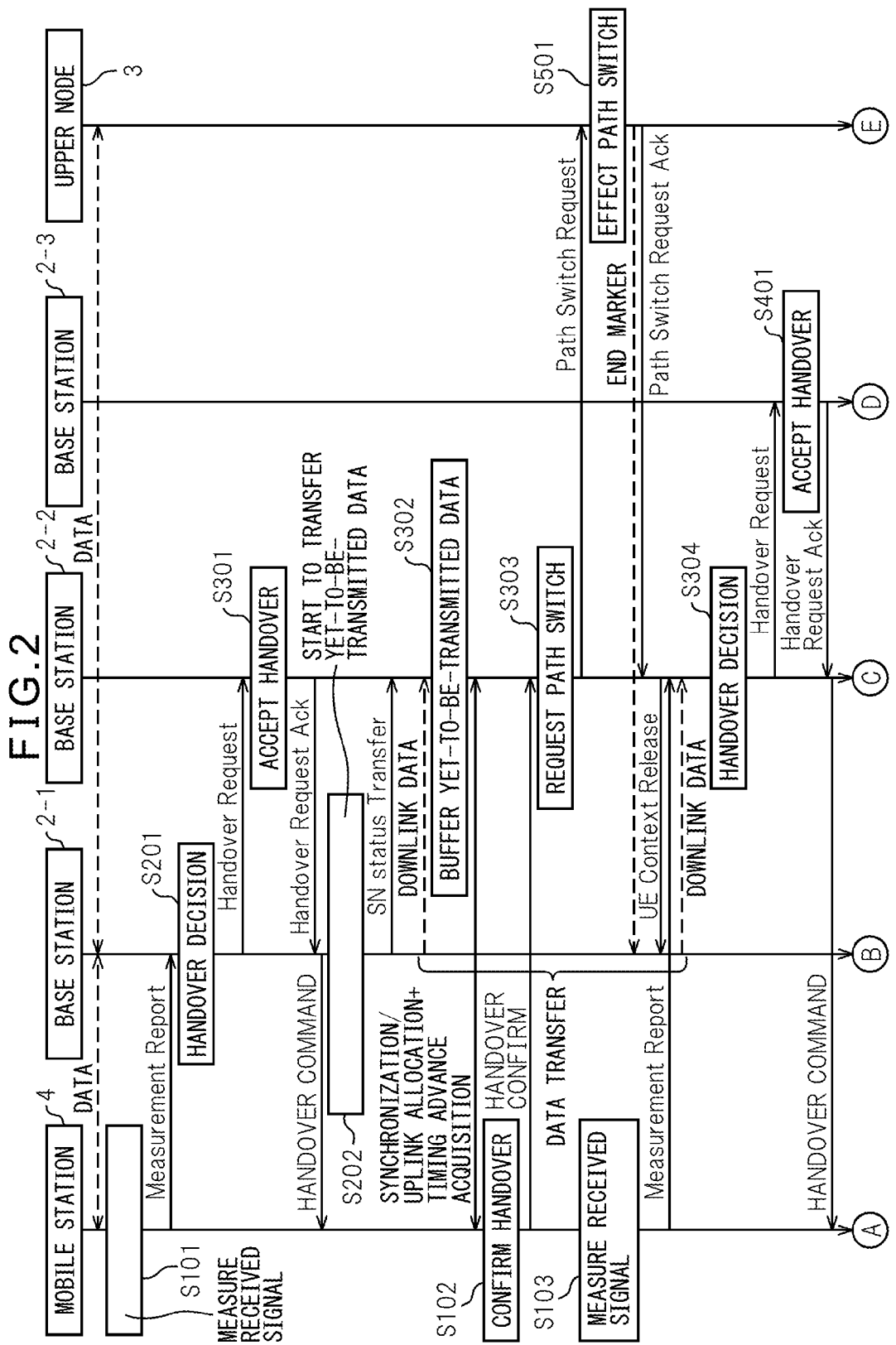
FIG. 2 is an operation sequence diagram illustrating the operation of the mobile communication system according to the present embodiment when handover occurs a plurality of times.
Figure 3:
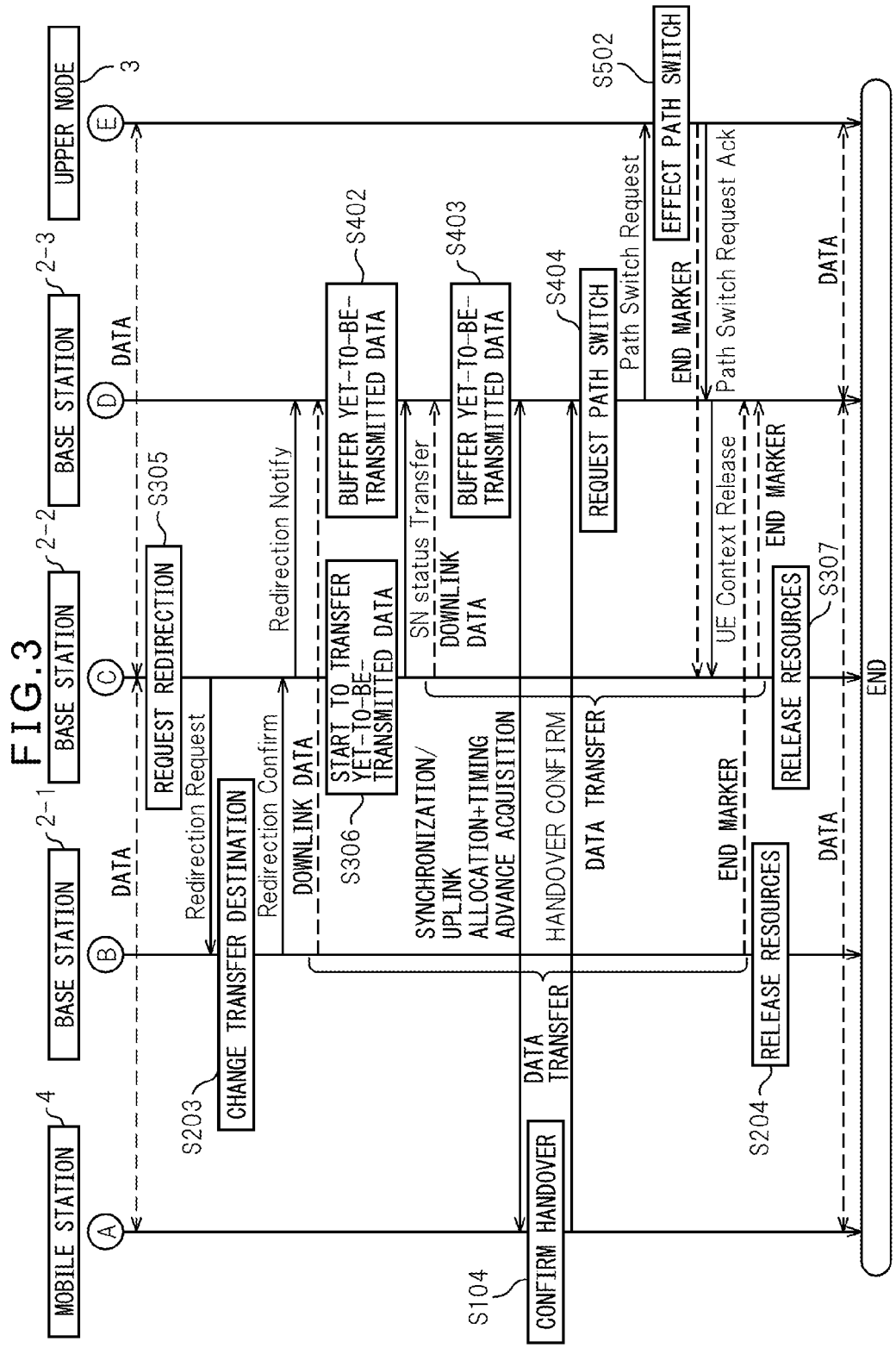
FIG. 3 is an operation sequence diagram illustrating the operation of the mobile communication system according to the present embodiment when handover occurs a plurality of times.

FIGS. 2 and 3 are an operation sequence diagram illustrating a handover process performed in the mobile communication system 1 when handover occurs a plurality of times. The operation of each apparatus will be described with reference to the operation sequence diagram by taking as an example the case in which the mobile station 4 moves from the communication area of the base station 2-1 to the communication area of the base station 2-3 by passing through the communication area of the base station 2-2.

In the initial state, the mobile station 4 is transmitting and receiving data via the base station 2-1. The mobile station 4 checks the conditions of the signals received from the base stations 2-1 and 2-2 by measuring the signals received from the respective base stations 2-1 and 2-2 (step S101). The mobile station 4 reports the results of the measurements to the base station 2-1. For example, the mobile station 4 sends the base station 2-1 a Measurement Report message which includes parameters indicating the measurement results of the signal reception conditions, as defined by the radio resource control (RRC) protocol.

If it is determined, based on the Measurement Report message, that the condition of the signal received from the base station 2-2 is better than the condition of the signal received from the base station 2-1, the base station 2-1 decides to execute a handover (step S201). Then, the base station 2-1 sends a Handover Request message to the base station 2-2, requesting it to prepare as the handover destination.

When the handover destination preparation request is received, the base station 2-2 reserves resources necessary for establishing a radio connection with the mobile station 4. Then, the base station 2-2 acts as the handover destination (step S301). The base station 2-2 returns a Handover Request Ack message to notify the base station 2-1 of the acceptance of the handover. Upon receiving the Handover Request Ack message, the base station 2-1 sends the mobile station 4 a HANDOVER COMMAND for executing the handover, as defined by the RRC protocol.

Further, of the downlink signals to be transmitted to the mobile station 4, the base station 2-1 starts to transfer the yet-to-be-transmitted data buffered in the storage unit of the base station 2-1 (step S202). The base station 2-1 sends the base station 2-2 an SN Status Transfer message that indicates the sequence number or the like of the first packet of the yet-to-be-transmitted data. Then, the base station 2-1 transfers the yet-to-be-transmitted data to the base station 2-2.

The base station 2-2 that received the yet-to-be-transmitted data from the base station 2-1 buffers the received data into the storage unit of the base station 2-2 (step S302). When the yet-to-be-transmitted data transferred from the base station 2-1 is received, the base station 2-2 sets a transfer status flag in a data transfer status table to a value that indicates that the data transfer from the base station 2-1 is in progress.

Figure 4:
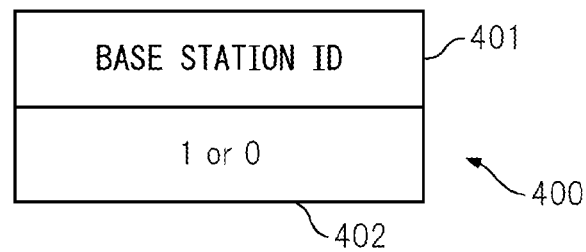
FIG. 4 is a diagram illustrating one example of a data transfer status table.

FIG. 4 is a diagram illustrating one example of the data transfer status table. The data transfer status table 400 stores the identification number 401 of the handover source base station and the transfer status flag 402 that indicates whether or not data is being received from the base station identified by the identification number 401. If the handover destination base station, i.e., the base station maintaining the data transfer status table 400, is in a state not receiving data, i.e., in a standby state, the transfer status flag 402 is set, for example, to "0". On the other hand, if the handover destination base station is in the process of receiving data from the base station identified by the identification number 401, the transfer status flag 402 is set, for example, to "1".

If there is more than one other base station that may transfer to the handover destination base station the yet-to-be-transmitted data of the downlink signals to be transmitted to the mobile station 4, the handover destination base station maintains one data transfer status table for each of such other base stations.

Referring back to FIG. 2, the mobile station 4 and the base station 2-2 perform processing for synchronization in order to establish a radio connection between them. Further, the mobile station 4 and the base station 2-2 perform processing for uplink signal allocation, and acquires the time taken for a signal transmitted from the mobile station 4 to reach the base station 2-2 (Timing Advance). After that, the mobile station 4 confirms that the handover from the base station 2-1 to the base station 2-2 can be accomplished (step S102). Then, the mobile station 4 sends the base station 2-2 a HANDOVER CONFIRM message indicating that it has been confirmed that the handover can be accomplished.

The base station 2-2 that received the HANDOVER CONFIRM message requests the upper node 3 to switch the path used for communication with the mobile station 4 (step S303). For this purpose, the base station 2-2 sends, for example, a Path Switch Request message to the upper node 3.

When the path switch is requested by the base station 2-2, the upper node 3 executes the path switch (step S501). Then, the upper node 3 sends the base station 2-1 an end marker indicating the end of the downlink signal transmitted to the mobile station 4. Further, the upper node 3 sends the base station 2-2 a Path Switch Request Ack message indicating that it has accepted to execute the path switch. The base station 2-2 sends the base station 2-1 a UE Context Release message notifying that the base station 2-1 can now release the resources used to maintain the radio connection with the mobile station 4.

Upon reception of the UE Context Release message, the base station 2-1 transfers all the yet-to-be-transmitted data to the base station 2-2 and thereafter releases the resources used to maintain the radio connection with the mobile station 4.

However, while the base station 2-1 is transferring the yet-to-be-transmitted data to the base station 2-2, the mobile station 4 continues to measure the signal received from each base station (step S103). The mobile station 4 then sends the base station 2-2 a Measurement Report message which includes parameters indicating the measurement results of the conditions of the signals received from the respective base stations 2-2 and 2-3.

If the mobile station 4 is moving from the communication area 2-2a of the base station 2-2 toward the communication area 2-3a of the base station 2-3; in this case, as the mobile station 4 moves closer to the base station 2-3, the condition of the signal received from the base station 2-3 improves and is better than the condition of the signal received from the base station 2-2. Then, by referring to the Measurement Report message, the base station 2-2 decides to execute a handover (step S304). Then, the base station 2-2 sends a Handover Request message to the base station 2-3. When the resources necessary for establishing a radio connection with the mobile station 4 have been reserved, the base station 2-3 accepts to act as the handover destination (step S401). The base station 2-3 returns a Handover Request Ack message to the base station 2-2. Upon receiving the Handover Request Ack message, the base station 2-2 sends a HANDOVER COMMAND to the mobile station 4.

In this way, a new handover occurs while the yet-to-be-transmitted data is being transferred from the base station 2-1 to the base station 2-2.

At this point in time, the mobile station 4 is transmitting and receiving data via the base station 2-2, as illustrated in FIG. 3.

However, the base station 2-2 has already received the handover accept message from the base station 2-3. Therefore, the base station 2-2 requests the base station 2-1, which is still transferring the yet-to-be-transmitted data to the base station 2-2, to change the transfer destination of the yet-to-be-transmitted data (step S305). More specifically, the base station 2-2 sends the base station 2-1 a Redirection Request message requesting that the transfer destination of the yet-to-be-transmitted data be changed.

In response to the Redirection Request message, the base station 2-1 changes the transfer destination of the yet-to-be-transmitted data from the base station 2-2 to the base station 2-3 (step S203). Then, the base station 2-1 returns a Redirection Confirm message to the base station 2-2 to notify that the transfer destination has been changed. However, when the Redirection Request message is received, if all the yet-to-be-transmitted data has already been transferred to the base station 2-2, the base station 2-1 returns a Redirection Failure message instead of the Redirection Confirm message.

The base station 2-2 that received the Redirection Confirm message sends the new destination base station 2-3 a Redirection Notify message notifying that the destination base station 2-3 has been designated as the transfer destination of the yet-to-be-transmitted data. Then, the base station 2-1 starts to transfer the yet-to-be-transmitted data to the base station 2-3.

Likewise, of the downlink signals to be transmitted to the mobile station 4, the base station 2-2 starts to transfer the yet-to-be-transmitted data buffered in the storage unit of the base station 2-2 (step S306). The base station 2-2 sends the base station 2-3 an SN Status Transfer message that indicates the sequence number or the like of the first packet of the yet-to-be-transmitted data. Then, the base station 2-2 transfers the yet-to-be-transmitted data to the base station 2-3.

The base station 2-3 that received the yet-to-be-transmitted data from the base station 2-1 buffers the received data into the storage unit of the base station 2-3 (step S402). Further, the base station 2-3 that received the yet-to-be-transmitted data from the base station 2-2 buffers the received data into the storage unit of the base station 2-3 (step S403). When the yet-to-be-transmitted data transferred from the base station 2-1 is received, the base station 2-3 sets the transfer status flag in the data transfer status table associated with the base station 2-1 to a value that indicates that the data transfer is in progress. Likewise, when the yet-to-be-transmitted data transferred from the base station 2-2 is received, the base station 2-3 sets the transfer status flag in the data transfer status table associated with the base station 2-2 to a value that indicates that the data transfer is in progress.

The mobile station 4 and the base station 2-3 synchronize in order to establish a radio connection between them. Further, the mobile station 4 and the base station 2-3 perform processing for uplink signal allocation, and acquires the time taken for a signal transmitted from the mobile station 4 to reach the base station 2-3 (Timing Advance). After that, the mobile station 4 confirms that the handover from the base station 2-2 to the base station 2-3 can be accomplished (step S104). Then, the mobile station 4 sends a HANDOVER CONFIRM message to the base station 2-3.

The base station 2-3 that received the HANDOVER CONFIRM message requests the upper node 3 to switch the path used for communication with the mobile station 4 (step S404). For this purpose, the base station 2-3 sends a Path Switch Request message to the upper node 3.

When the path switch is requested by the base station 2-3, the upper node 3 once again executes the path switch (step S502). Then, the upper node 3 sends the base station 2-2 an end marker indicating the end of the downlink data transmitted to the mobile station 4. Further, the upper node 3 sends a Path Switch Request Ack message to the base station 2-3. The base station 2-3 that received the Path Switch Request Ack message sends a UE Context Release message to the base station 2-2.

Upon reception of the UE Context Release message, the base station 2-2 transfers all the yet-to-be-transmitted data and the end marker indicating the end of the yet-to-be-transmitted data to the base station 2-3, and thereafter releases the resources used to maintain the radio connection with the mobile station 4 (step S307). Then, the base station 2-2 discards the downlink signal buffered in its storage unit.

The base station 2-1 has already received the UE Context Release message. Therefore, after transferring all the yet-to-be-transmitted data and the end marker indicating the end of the yet-to-be-transmitted data to the base station 2-3, the base station 2-1 releases the resources used to maintain the radio connection with the mobile station 4 (step S204). Then, the base station 2-1 discards the downlink signal buffered in its storage unit.

After that, the handover is completed, and the mobile station 4 transmits and receives signals via the base station 2-3.

In a situation where three or more handovers occur in succession, the source base station for the most recent handover executes the process starting from step S305. Then, the destination base station for the most recent handover executes the process starting from step S402.

Figure 5:
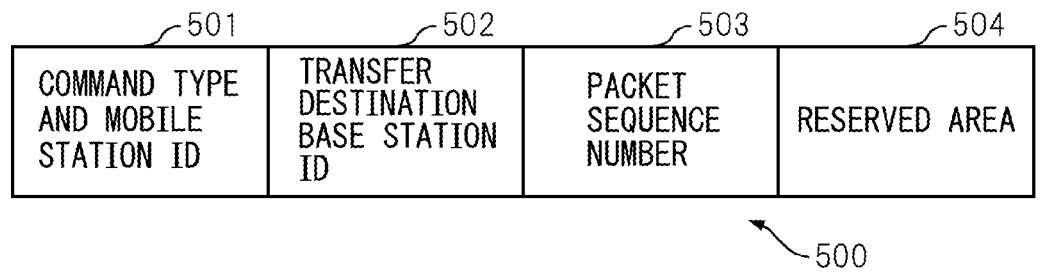
FIG. 5 is a diagram illustrating one example of the format of a Redirection Request message.

FIG. 5 is a diagram illustrating one example of the format of the Redirection Request message. The Redirection Request message 500 carries an identifier 501 for identifying the message type and the mobile station as the destination of the downlink signal, a base station identification number 502 for identifying the base station, a sequence number 503 indicating the packet position, and a reserved area 504. The base station identification number 502 indicates the base station designated as the new transfer destination. On the other hand, the sequence number 503 indicates the position of the packet at the head of the data yet to be transmitted to the mobile station 4. The reserved area 504 is used when there is other information to be sent to the data transferring base station together with the Redirection Request message. The reserved area 504 is, for example, 128 bits long.

Figure 6:
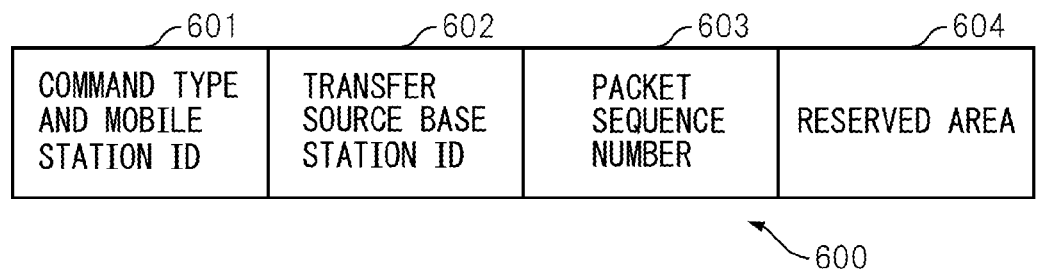
FIG. 6 is a diagram illustrating one example of the format of a Redirection Confirm message.

FIG. 6 is a diagram illustrating one example of the format of the Redirection Confirm message. The Redirection Confirm message 600 carries an identifier 601 for identifying the message type and the mobile station as the destination of the downlink signal, a base station identification number 602 for identifying the base station, a sequence number 603 indicating the packet position, and a reserved area 604. The base station identification number 602 indicates the transfer source base station. On the other hand, the sequence number 603 indicates the position of the packet at the head of the data yet to be transmitted to the mobile station 4. The reserved area 604 is used when there is other information to be sent to the Redirection Request message originating base station together with the Redirection Confirm message. The reserved area 604 is, for example, 128 bits long.

Figure 7:
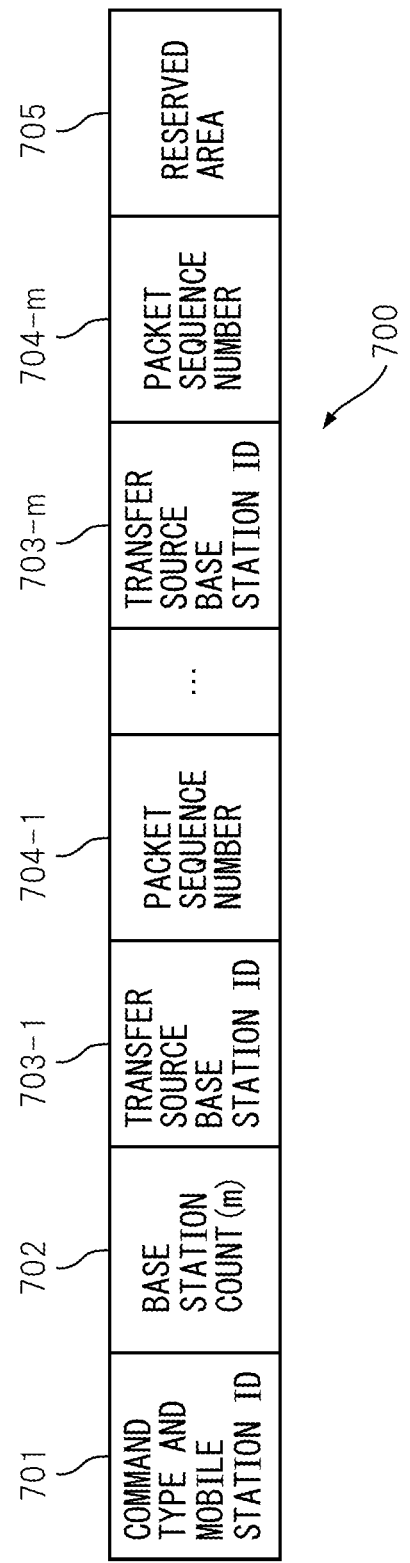
FIG. 7 is a diagram illustrating one example of the format of a Redirection Notify message.

FIG. 7 is a diagram illustrating one example of the format of the Redirection Notify message. The Redirection Notify message 700 carries an identifier 701 for identifying the message type and the mobile station as the destination of the downlink signal. The Redirection Notify message 700 further carries a base station count 702, a base station identification number 703-$i$ for identifying the base station ($i$=1, 2, ..., m, where m is the number specified by the base station count 702), a sequence number 704-$i$ indicating the packet position ($i$=1, 2, ..., m), and a reserved area 705. The base station count 702 is a count of the number of base stations which transfers the yet-to-be transmitted data to the base station to which the mobile station 4 is connected via radio by the most recent handover. For example, in the case of the Redirection Notify message sent in response to the processing of step S305 in FIG. 3, the base station 2-3 receives the yet-to-be transmitted data from the base stations 2-1 and 2-2. The base station count 702 therefore indicates "2". In the case where three or more handovers occur in succession, the base station count 702 increases as the number of base stations that transfer the yet-to-be transmitted data to the most recent handover destination base station increases. The base station identification number 703-$i$ indicates the transfer source base station. The sequence number 704-$i$ ($i$=1, 2, ..., m) indicates the position of the packet at the head of the yet-to-be-transmitted data of the downlink signal buffered at the base station indicated by the corresponding station identification number 703-$i$. Preferably, in the Redirection Notify message 700, the base station identification numbers 703-$i$ and the sequence numbers 704-$i$ are respectively arranged in the order of occurrence of the handovers, starting from the least recent handover source base station, in order to prevent the ordering of the yet-to-be-transmitted data from being changed. The reserved area 705 is used when there is other information to be sent to the most recent handover destination base station together with the Redirection Confirm message. The reserved area 705 is, for example, 128 bits long.

Figure 8:
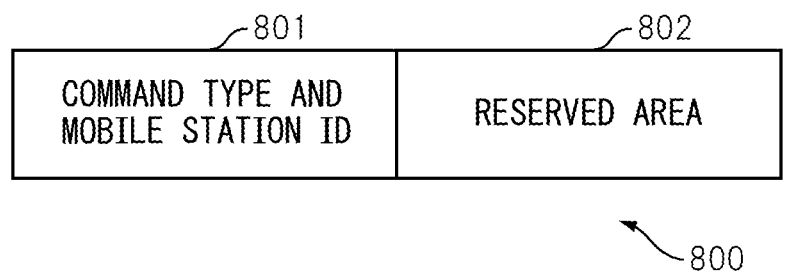
FIG. 8 is a diagram illustrating one example of the format of a Redirection Failure message.

FIG. 8 is a diagram illustrating one example of the format of the Redirection Failure message. The Redirection Failure message 800 carries an identifier 801 for identifying the message type and the mobile station as the destination of the downlink signal, and a reserved area 802.

Each of the Redirection Request, Redirection Confirm, Redirection Notify, and Redirection Failure messages may not carry a reserved area.

The configuration of each apparatus in the mobile communication system 1 for implementing the above process will be described in detail below.

Figure 9:
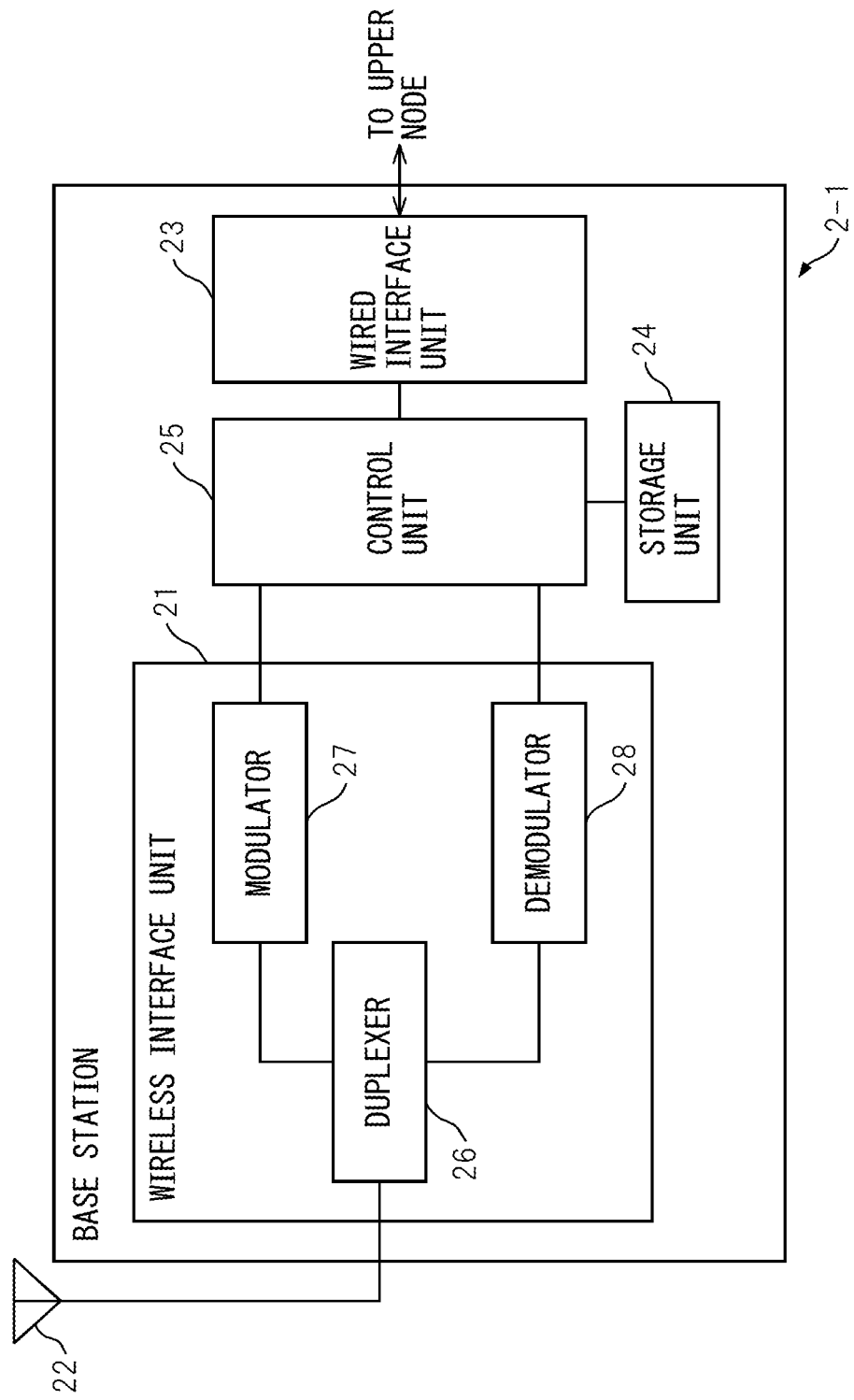
FIG. 9 is a diagram schematically illustrating the configuration of a base station.

FIG. 9 is a diagram schematically illustrating the configuration of the base station 2-1. Since each of the base stations is identical in function and configuration, the following description deals with only one base station.

The base station 2-1 includes a wireless interface unit 21, an antenna 22, a wired interface unit 23, a storage unit 24, and a control unit 25. The wireless interface unit 21 includes a duplexer 26, a modulator 27, and a demodulator 28. The wireless interface unit 21, the storage unit 24, and the control unit 25 are implemented as separate circuits. Alternatively, these units may be incorporated in the base station 2-1 as a single integrated circuit on which the circuits corresponding to the respective units are integrated.

The modulator 27 in the wireless interface unit 21 receives from the control unit 25 various kinds of control signals and the downlink signal encoded for transmission, and multiplexes and modulates these signals in accordance with a prescribed multiplexing scheme. The prescribed multiplexing scheme here is, for example, an orthogonal frequency-division multiplexing (OFDM) scheme. The modulator 27 superimposes the multiplexed downlink signal and control signals onto a carrier having a radio frequency. Then, the modulator 27 amplifies the downlink signal and control signals, superimposed on the carrier, to a desired level by a high-power amplifier (not depicted), and passes them via the duplexer 26 to the antenna 22.

On the other hand, the uplink signal and control signals received by the antenna 22 are passed via the duplexer 26 to the demodulator 28 in the wireless interface unit 21 and are amplified by a low-noise amplifier (not depicted). The demodulator 28 multiplies the amplified uplink signal and control signals by a periodic signal having an intermediate frequency and thereby converts the frequency of the uplink signal and control signals from the radio frequency to the baseband frequency. Then, the demodulator 28 demultiplexes and demodulates the uplink signal in accordance with a prescribed multiplexing scheme. The demodulator 28 then passes the demultiplexed uplink signal and control signals to the control unit 25. A single carrier frequency division multiplexing (SC-FDMA) scheme, for example, may be employed as the multiplexing scheme for the uplink signal.

The downlink signal or control signals passed from the modulator 27 via the duplexer 26 are radiated from the antenna 22.

On the other hand, the uplink signal or various kinds of control signals transmitted from the mobile station terminal 4 are received by the antenna 22 and passed via the duplexer 26 to the demodulator 28.

The wired interface unit 23 includes a communication interface circuit for connecting to the upper node 3. The wired interface unit 23 receives the downlink signal or control signals from the upper node 3 and passes the downlink signal or control signals to the control unit 25. Further, the wired interface unit 23 receives the uplink signal or control signals from the control unit 25 and transmits the uplink signal or control signals to the upper node 3.

The storage unit 24 includes, for example, an alterable nonvolatile semiconductor memory. The storage unit 24 stores various kinds of information, such as identification information of the base station 2-1 and the frequencies used, that are used for controlling the radio connection with the mobile station terminal 4. The storage unit 24 also store temporarily the uplink signal or the downlink signal. Further, the storage unit 24 stores data transfer status tables.

The control unit 25 includes, for example, one or a plurality of processors and their peripheral circuitry. The control unit 25 has the functions of Radio Resource Control (RRC) and Radio Resource Management (RRM). Then, in accordance with a prescribed call control protocol, the control unit 25 performs processing, such as call control and handover, for the mobile station 4 entering the communication area of the base station 2-1 in order to establish a radio connection between the base station 2-1 and the mobile station 4.

The control unit 25 may further include the functions of Radio Link Control (RLC) and Media Access Control (MAC). Then, the control unit 25 may perform processing, such as retransmission control and reordering, for transmission and reception of signals to and from the mobile station 4.

The control unit 25 converts a control command, such as a connection request, setup request, or path switch request, generated by the function of RRC, etc., for transmission to the upper node 3, into a format conforming to the S1 interface defined for communication between the base station and the upper node. The control unit 25 sends the control command to the upper node 3 via the wired interface unit 23. The control unit 25 receives a control command, such as a setup response or a path switch confirm, from the upper node 3 via the wired interface unit 23. The control unit 25 that received the control command from the upper node 3 analyzes the control command in accordance with the S1 interface, and determines to which of the RRC and other functions the control command corresponds. Then, the control unit 25 performs the processing appropriate to the control command.

Further, the control unit 25 converts control commands generated by the function of RRC, etc., for transmission among the base stations into a format conforming to the X2 interface defined as a communication interface for communication between base stations. The control commands transmitted among the base stations include, for example, Handover Request, Redirection Request, Redirection Confirm, Redirection Failure, and Redirection Notify, which are used in the sequence illustrated in FIGS. 2 and 3. The control unit 25 transmits such control commands to another base station via the wired interface unit 23. The control unit 25 also receives such control commands from other base station via the wired interface unit 23. The control unit 25 that received any such control command from another base station analyzes the control command in accordance with the X2 interface, and determines to which of the RRC and other functions the control command corresponds. Then, the control unit 25 performs the processing appropriate to the control command.

The control unit 25 applies transmission processing such as error-correction coding to the downlink signal transferred from the wired interface unit 23 for transmission to the mobile station terminal 4. The control unit 25 then passes the encoded downlink signal to the modulator 27. Further, the control unit 25 receives the uplink signal transmitted from the mobile station 4 and demodulated by the demodulator 28, and applies reception processing such as error-correction decoding to the received signal. The control unit 25 then passes the decoded uplink signal to the wired interface unit 23.

Next, referring to FIGS. 10 to 13, a detailed description will be given of how the yet-to-be-transmitted data, among the downlink signals received from the upper node 3, is transferred to another base station in a situation where a plurality of handovers occur.

Figure 10:
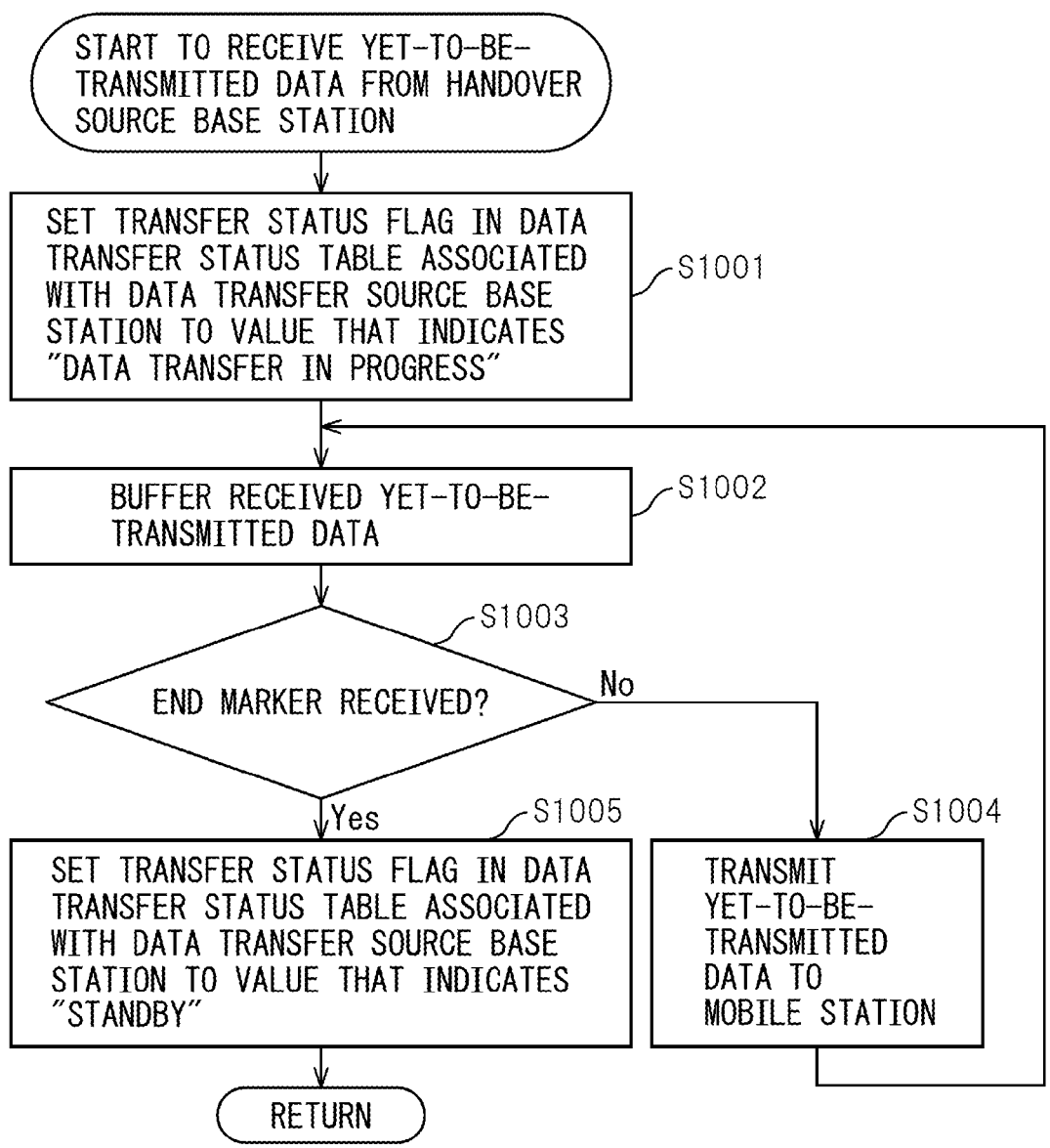
FIG. 10 is a flowchart illustrating a data transfer status conformation process which is performed at a handover destination base station.

FIG. 10 is a flowchart illustrating a data transfer status conformation process which is performed at the handover destination base station. This process is initiated when the base station begins to receive from other base station the data not yet transmitted to the mobile station 4 among the downlink signals. For example, in the operation sequence in FIGS. 2 and 3, the base stations 2-2 and 2-3 each perform this process.

The control unit 25 sets the transfer status flag in the data transfer status table associated with the data transfer source base station to a value that indicates "data transfer in progress" (step S1001). Then, the control unit 25 buffers the received yet-to-be-transmitted data into the storage unit 24 (step S1002).

Further, the control unit 25 determines whether an end marker indicating the completion of transfer of the yet-to-be-transmitted data is received from the data transfer source base station (step S1003).

If the base station has not yet received the end marker (No in step S1003), the control unit 25 transmits the yet-to-be-transmitted data to the mobile station 4 (step S1004). Then, the control unit 25 returns control to step S1002.

On the other hand, if the base station has received the end marker (Yes in step S1003), the control unit 25 sets the transfer status flag in the data transfer status table associated with the data transfer source base station to a value that indicates "standby" (step S1005).

After step S1005, the control unit 25 terminates the data transfer status conformation process.

Figure 11:
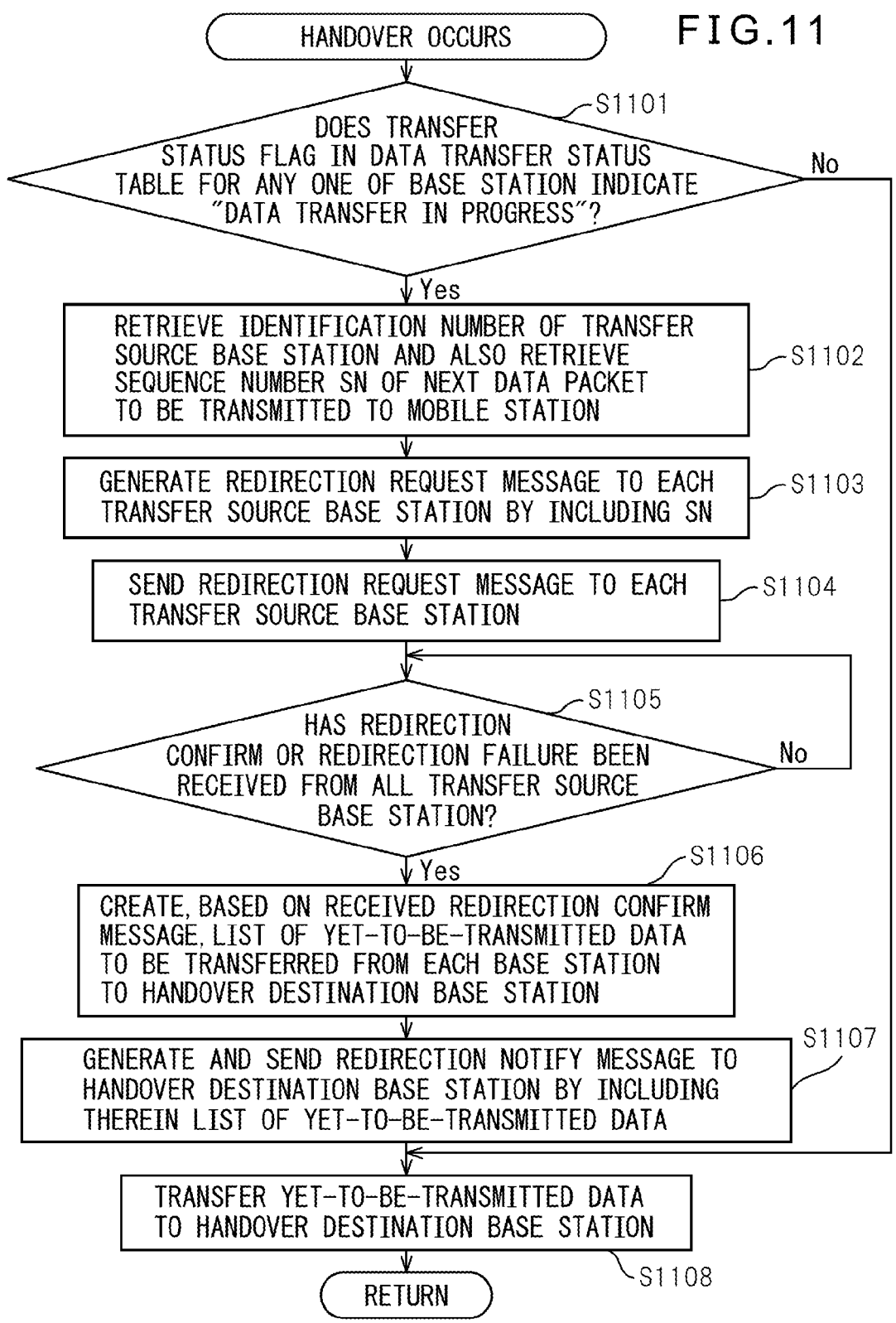
FIG. 11 is a flowchart illustrating a data redirection process.

FIG. 11 is a flowchart illustrating a data redirection process. This data redirection process is performed by the handover source base station when a handover occurs. For example, in the operation sequence in FIGS. 2 and 3, the base station 2-2 performs this process.

The control unit 25 determines whether the transfer status flag in the data transfer status table for any one of the base stations indicates "data transfer in progress" (step S1101).

If the transfer status flag in the data transfer status table for every one of the base stations indicates "standby" (No in step S1101), this means that the transfer of the yet-to-be-transmitted data due to the previous handover is already completed. Therefore, the control unit 25 transfers the yet-to-be-transmitted data buffered in the storage unit 24 to the handover destination base station via the wired interface unit 23 (step S1108), in the same manner as when a handover occurs only once.

On the other hand, if the transfer status flag in the data transfer status table for any one of the base stations indicates "data transfer in progress" (Yes in step S1101), the control unit 25 retrieves the identification number of the transfer source base station by referring to that data transfer status table. The control unit 25 further retrieves the sequence number SN of the next data packet to be transmitted to the mobile station 4 (step S1102). Then, the control unit 25 generates the Redirection Request message to each transfer source base station by including the SN (step S1103). The control unit 25 sends the Redirection Request message to each transfer source base station (step S1104).

After that, the control unit 25 confirms if Redirection Confirm or Redirection Failure has been received from all of the transfer source base stations (step S1105). If the base station has not yet received Redirection Confirm or Redirection Failure from one or some of the transfer source base stations (No in step S1105), the control unit 25 repeats the process of step S1105 at predetermined intervals of time (for example, every 10 msec).

On the other hand, if the base station has received Redirection Confirm or Redirection Failure from all of the transfer source base stations (Yes in step S1105), the control unit 25 creates, based on the received Redirection Confirm message, a list of the yet-to-be-transmitted data to be transferred from each base station to the handover destination base station (step S1106). The list of the yet-to-be-transmitted data carries, for example, the identification information of each data transfer source base station and the sequence number indicating the start position of the packets that each data transfer source base station transfers.

The control unit 25 generates the Redirection Notify message to the handover destination base station by including therein the identification information of each data transfer source base station and the sequence numbers carried in the list of the yet-to-be-transmitted data. The control unit 25 sends the Redirection Notify message via the wired interface unit 23 (step S1107).

After that, the control unit 25 transfers the yet-to-be-transmitted data to the handover destination base station via the wired interface unit 23 (step S1108).

Thereafter, the control unit 25 terminates the data redirection process.

Figure 12:
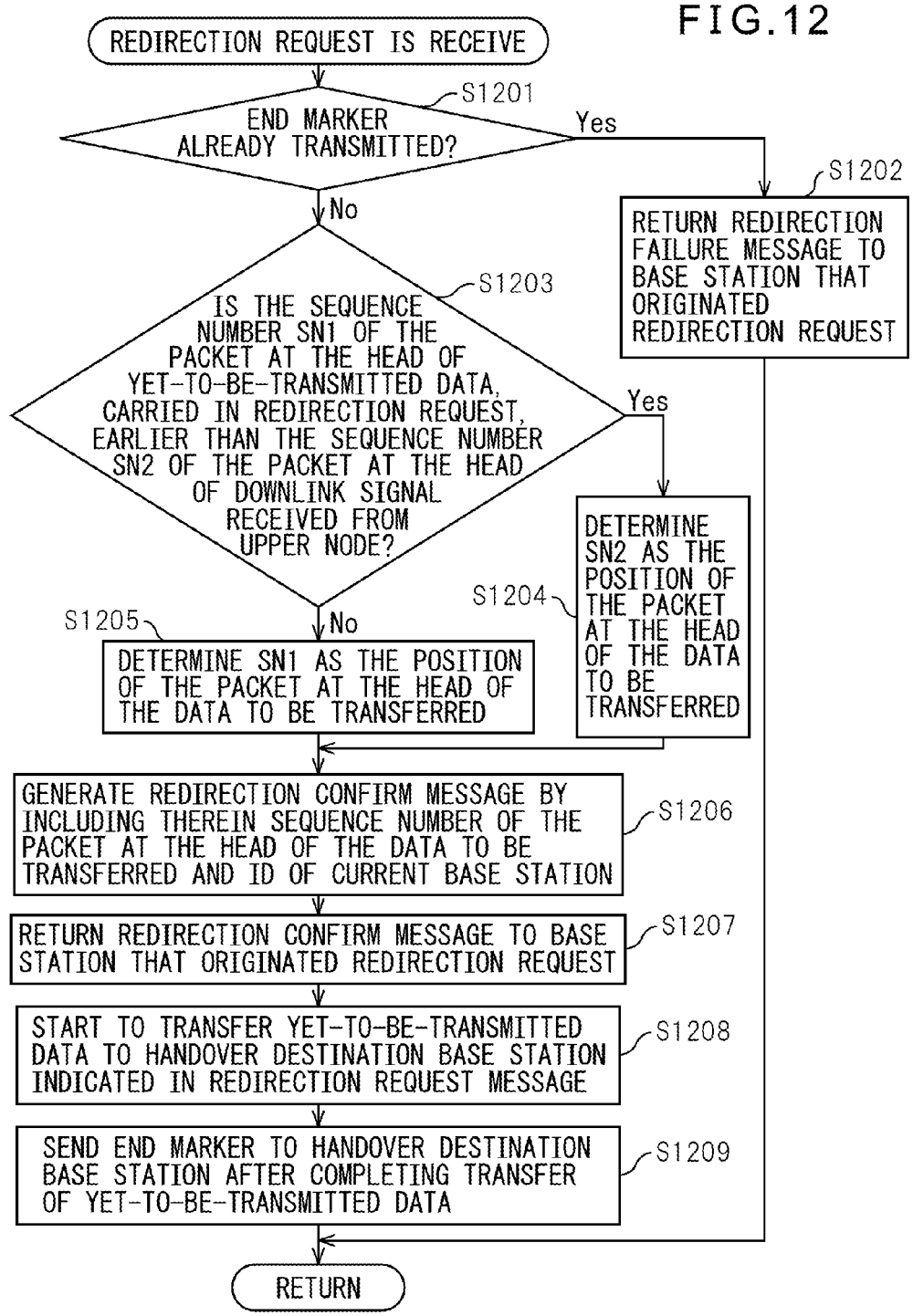
FIG. 12 is a flowchart illustrating a data transfer process.

FIG. 12 is a flowchart illustrating the data transfer process. This data transfer process is initiated when the base station receives a Redirection Request message from other base station. For example, in the operation sequence in FIGS. 2 and 3, the base station 2-1 performs this process.

The control unit 25 determines whether the end marker has already been transmitted (step S1201). If the end marker has already been transmitted, i.e., if the transfer of the yet-to-be-transmitted data is already completed (Yes in step S1201), the control unit 25 returns a Redirection Failure message to the base station that originated the Redirection Request (step S1202).

On the other hand, if the end marker has not yet been transmitted (No in step S1201), this means that the transfer of the yet-to-be-transmitted data is not yet completed. Therefore, the control unit 25 identifies the packet at the head of the data to be transferred. For this purpose, the control unit 25 determines whether the sequence number SN1 of the packet at the head of the yet-to-be-transmitted data, carried in the Redirection Request, is earlier than the sequence number SN2 of the packet at the head of the downlink signal received from the upper node 3 (step S1203).

If SN1 is earlier than SN2 (Yes in step S1203), this means that the packets from SN1 to SN2 have been transmitted from the upper node 3 to the previous serving base station to which the mobile station had been linked via radio before it was linked to the current serving base station. Therefore, the packets from the sequence number SN1 to the sequence number SN2 are transferred from the previous serving base station directly to the new handover destination base station. Then, the control unit 25 determines SN2 as the position of the packet at the head of the data to be transferred (step S1204). On the other hand, if SN2 is equal to or earlier than SN1 (No in step S1203), the start position of the packets not yet transmitted to the mobile station 4 is contained in the packets that the current base station has received from the upper node 3. Then, the control unit 25 determines SN1 as the position of the packet at the head of the data to be transferred (step S1205).

After step S104 or S105, the control unit 25 generates a Redirection Confirm message by including therein the sequence number of the packet at the head of the data to be transferred and the ID of the current base station (step S1206). Then, the control unit 25 returns a Redirection Confirm message to the base station that originated the Redirection Request (step S1207).

After that, the control unit 25 starts to transfer the yet-to-be-transmitted data to the handover destination base station indicated in the Redirection Request message (step S1208). When the transfer of the yet-to-be-transmitted data is completed, the control unit 25 sends an end marker to the handover destination base station (step S1209).

Thereafter, the control unit 25 terminates the data transfer process.

Figure 13:
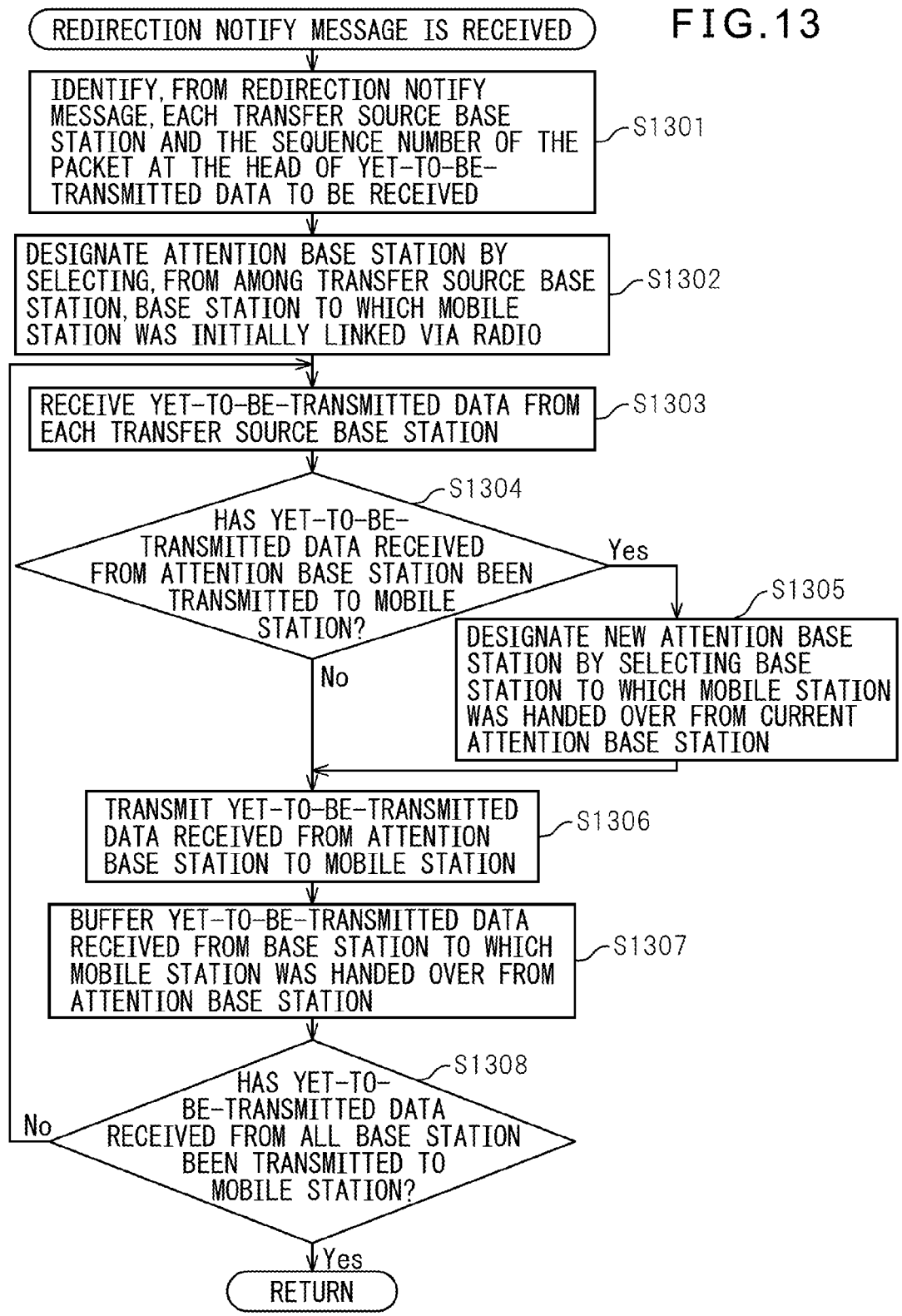
FIG. 13 is a flowchart illustrating a redirected data receiving process which is performed at the most recent handover destination base station.

FIG. 13 is a flowchart illustrating a redirected data receiving process which is performed at the most recent handover destination base station. This process is initiated when the base station receives a Redirection Notify message from other base station. For example, in the operation sequence in FIGS. 2 and 3, the base station 2-3 performs this process.

The control unit 25 identifies, from the Redirection Notify message, each transfer source base station and the sequence number indicating the position of the packet at the head of the yet-to-be-transmitted data to be received from the transfer source base station (step S1301). Then, the control unit 25 designates an attention base station by selecting, from among the transfer source base stations, the base station to which the mobile station was initially linked via radio (step S1302).

The control unit 25 receives the yet-to-be-transmitted data from each transfer source base station (step S1303). The control unit 25 determines whether the yet-to-be-transmitted data received from the attention base station has already been transmitted to the mobile station 4 (step S1304). If the yet-to-be-transmitted data received from the attention base station has already been transmitted to the mobile station 4 (Yes in step S1304), the control unit 25 designates a new attention base station by selecting the base station to which the mobile station was handed over from the current attention base station (step S1305).

After step S1305, or if the transmission of the yet-to-be-transmitted data received from the attention base station for transmission to the mobile station 4 is not completed yet (No in step S1304), the control unit 25 transmits the yet-to-be-transmitted data received from the attention base station to the mobile station 4 (step S1306). More specifically, the control unit 25 applies prescribed transmission processing to the yet-to-be-transmitted data, and passes the processed yet-to-be-transmitted data to the modulator 27. The modulator 27 then applies multiplexing and modulation to the yet-to-be-transmitted data, after which the yet-to-be-transmitted data is transmitted to the mobile station 4 via the antenna 22.

The control unit 25 buffers in the storage unit 24 the yet-to-be-transmitted data received from the base station to which the mobile station 4 was handed over from the attention base station (step S1307).

The control unit 25 determines whether the yet-to-be-transmitted data received from all the base stations has been transmitted to the mobile station 4 (step S1308). If the yet-to-be-transmitted data received from one or some of the base stations has not yet been transmitted to the mobile station 4 (No in step S1308), the control unit 25 repeats the process from step S1303 to step S1308.

On the other hand, if the yet-to-be-transmitted data received from all the base stations has already been transmitted to the mobile station 4 (Yes in step S1308), the control unit 25 terminates the redirected data receiving process.

Figure 14:
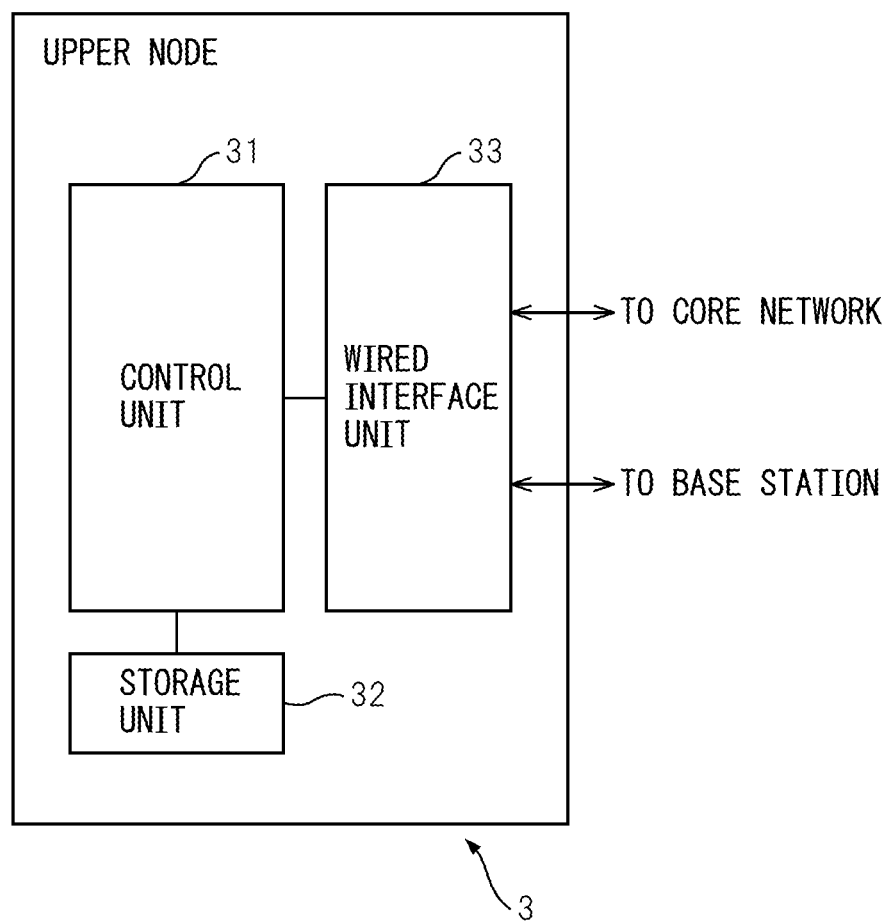
FIG. 14 is a diagram schematically illustrating the configuration of an upper node.

FIG. 14 is a diagram schematically illustrating the configuration of the upper node 3. The upper node 3 includes a control unit 31, a storage unit 32, and a wired interface unit 33.

The control unit 31 includes, for example, one or a plurality of processors and their peripheral circuitry. The control unit 31 has the function of supervising the location and condition of each mobile station located within the communication area served by any one of the base stations connected to the upper node 3.

Further, the control unit 31 performs routing for the signal received from the currently communicating mobile station 4. For example, the control unit 31 passes the uplink signal, received from the currently communicating mobile station 4, to the wired interface unit 33 which then transmits out the signal on the core network. On the other hand, when a downlink signal addressed to the currently communicating mobile station 4 is received from the core network via the wired interface unit 33, the control unit 31 transmits the downlink signal via the wired interface unit 33 to the base station to which the mobile station is linked via radio.

At this time, if a Path Switch Request message is received from the handover destination base station, the control unit 31 switches the destination of the downlink signal from the handover source base station to the handover destination base station.

The storage unit 32 includes, for example, an alterable nonvolatile semiconductor memory. The storage unit 32 stores various kinds of information used to perform control to communicate with the mobile station radio-linked to any one of the base stations connected to the upper node 3.

The wired interface unit 33 includes a communication interface for connecting the upper node 3 to the core network or to any one of the base stations. The wired interface unit 33 receives from the core network the downlink signal addressed to the mobile station radio-linked to any one of the base stations connected to the upper node 3, and passes the downlink signal to the control unit 31. Further, when the downlink signal is received from the control unit 31, the wired interface unit 33 transmits the downlink signal to the base station to which the mobile station as the destination of the downlink signal is linked via radio.

On the other hand, when an uplink signal is received from any one of the base stations, the wired interface unit 33 passes the uplink signal to the control unit 31. Further, when the uplink signal is received from the control unit 31, the wired interface unit 33 transmits out the uplink signal on the core network.

Figure 15:
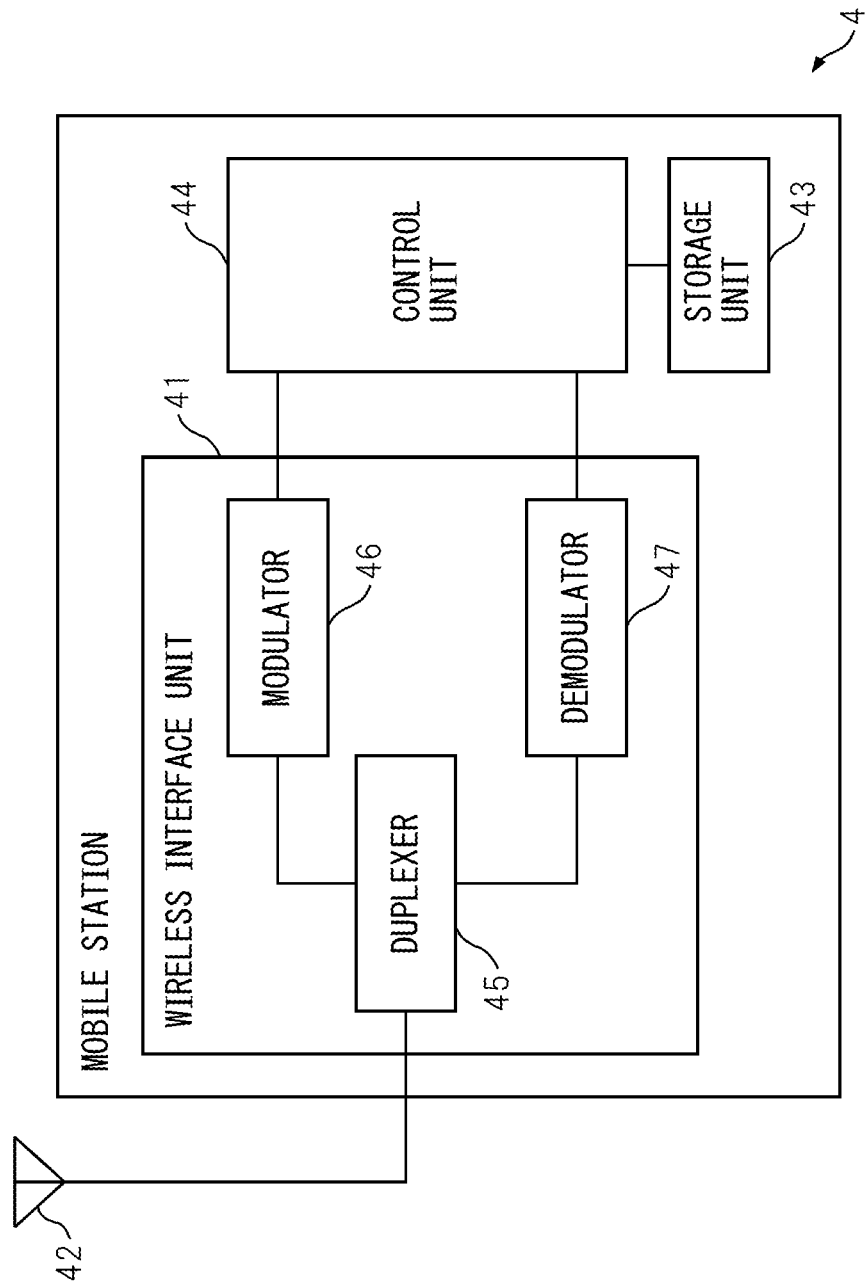
FIG. 15 is a diagram schematically illustrating the configuration of a mobile station.

FIG. 15 is a diagram schematically illustrating the configuration of the mobile station 4. The mobile station 4 includes a wireless interface unit 41, an antenna 42, a storage unit 43, and a control unit 44. The wireless interface unit 41 includes a duplexer 45, a modulator 46, and a demodulator 47. The wireless interface unit 41, the storage unit 43, and the control unit 44 are implemented as separate circuits. Alternatively, these units may be incorporated in the mobile station 4 as a single integrated circuit on which the circuits corresponding to the respective units are integrated.

The wireless interface unit 41 and antenna 42 depicted are identical in function and configuration to the wireless interface unit 21 and antenna 22 of the base station 2-1 depicted in FIG. 9, except for the multiplexing scheme employed. Therefore, a detailed description of the wireless interface unit 41 and antenna 42 is not provided.

The modulator 46 in the wireless interface unit 41 multiplexes the uplink signal by using, for example, an SC-FDMA scheme. On the other hand, the demodulator 47 demultiplexes the multiplexed downlink signal by using, for example, an OFDMA scheme.

The storage unit 43 includes, for example, an alterable nonvolatile semiconductor memory. The storage unit 43 stores various kinds of information used to perform control to communicate with the base station.

The control unit 44 includes the functions of Radio Resource Control (RRC) and Radio Resource Management (RRM). The control unit 44 performs processing, such as location registration, call control, and handover, for establishing a radio connection between the mobile station 4 and the base station. For this purpose, the control unit 44 generates a control signal used for establishing a radio connection between the mobile station 4 and the base station, and passes the control signal to the modulator 46. Further, the control unit 44 performs processing in accordance with a control signal received from any one of the base stations.

The control unit 44 applies transmission processing, such as information source coding and error-correction coding, to the uplink signal which carries a voice signal or data signal acquired via a microphone (not depicted) or via a user interface such as a keypad (not depicted). The control unit 44 passes the encoded uplink signal to the modulator 46. Further, the control unit 44 receives the downlink signal transmitted via radio from the serving base station and demodulated by the demodulator 47, and applies reception processing, such as error-correction decoding and information source decoding, to the received signal. Then, the control unit 44 recovers the voice signal or data signal from the decoded downlink signal.

The control unit 44 reproduces the recovered voice signal through a speaker (not depicted) or displays the data signal on a display (not depicted).

As has been described above, according to the mobile communication system disclosed herein, when a plurality of handovers occur in succession, each base station buffering the downlink signal can transfer the buffered downlink signal directly to the most recent handover destination base station. Accordingly, even when two or more handovers occur in succession, the mobile communication system can prevent any yet-to-be-transmitted downlink signal from being transferred more than twice among the base stations. In this way, the mobile communication system can reduce the number of data transfers when a plurality of handovers occur in succession, and this also serves to reduce the possibility of all or part of the yet-to-be-transmitted downlink signal being lost during transfer.

The present invention is not limited to the above embodiment. For example, each base station that received the Redirection Request message may transmit the Redirection Confirm message or the Redirection Failure message directly to the most recent handover destination base station indicated in the Redirection Request message. In this case, by referring to each Redirection Confirm message, the most recent handover destination base station can identify the downlink signal to be transferred from the corresponding base station. In this case also, it is preferable that the base station that transmitted the Redirection Request message also transmits the list of the destinations of the Redirection Request message to the most recent handover destination base station. The most recent handover destination base station can then identify each base station about to transfer the downlink signal.

Further, each base station that received the Redirection Request message may transfer all the packets, including the packet at the head of the downlink signal received from the upper node and buffered in the storage unit, to the most recent handover destination base station. In this case, the most recent handover destination base station may receive from the handover source base station the sequence number of the packet at the head of the data yet to be transmitted to the mobile station, and may transmit the packet designated by that sequence number and the subsequent packets to the mobile station.

Further, after the downlink signal transferred from any particular base station has been transmitted to the mobile station, the most recent handover destination base station may notify that particular base station of the completion of the transmission. In this case, the base station that transferred the downlink signal may hold the downlink signal until the base station receives the notification notifying that the transmission of the downlink signal received from the upper node has been completed. The base station requested to transfer the downlink signal may return the Redirection Confirm message upon reception of the Redirection Request message, without checking whether the end marker has been transmitted or not. With this arrangement, even when a new handover occurs after the base station has transferred the downlink signal to another base station, the base station can transfer the downlink signal received from the upper node directly to the most recent handover destination base station. Accordingly, if three or more handovers have occurred in succession, the most recent handover destination base station can preserve the transmission sequence integrity of the downlink signal by transmitting the downlink signal transferred from each base station in the order of occurrence of the handovers.

It will also be recognized that the base stations, the upper node, and the mobile station may each be an apparatus that complies with a communication standard other than LTE in which the downlink signal can be transferred directly between the base stations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A mobile communication system comprising:
a plurality of base stations;
an upper node connected to the plurality of base stations; and
a mobile station capable of connecting via radio to any one of the plurality of base stations, wherein
while a first base station of the plurality of base stations that is currently connected via radio to the mobile station is receiving a first downlink signal from a second base station of the plurality of base stations that was previously connected via radio to the mobile station and that received the first downlink signal from the upper node for transmission to the mobile station, when the mobile station is connected via radio to a third base station of the plurality of base stations as a result of a handover, the first base station sends a redirection request signal requesting the second base station to redirect the first downlink signal to the third base station, the redirection request signal including identification information identifying the third base station and packet position information indicating the start position of the packets of the first downlink signal that are yet to be transmitted to the mobile station, and
the second base station, in response to the redirection request signal, transfers to the third base station the packets of the first downlink signal starting from the start position indicated by the packet position information.

2. The mobile communication system according to claim 1, wherein when the packet position indicated by the packet position information is earlier than the position of the packet at the head of the first downlink signal, the second base station transfers to the third base station the packets of the first downlink signal starting from the packet at the head thereof, and when the packet position indicated by the packet position information is not earlier than the position of the packet at the head of the first downlink signal, the second base station transfers to the third base station the packets starting from the start position indicated by the packet position information.

3. The mobile communication system according to claim 1, wherein when the mobile station is connected via radio to the third base station before the first base station transmits at least a portion of a second downlink signal received from the upper node to the mobile station, the first base station transfers at least the portion of the second downlink signal to the third base station, and
the third base station transmits at least the portion of the second downlink signal to the mobile station after transmitting the first downlink signal received from the first base station to the mobile station.

4. A base station comprising:
an interface unit for connecting with another base station;
a wireless interface unit for connecting via radio with a mobile station located within a communication coverage area of the base station; and
a control unit which, while the base station that is currently connected via radio to the mobile station is receiving a first downlink signal yet to be transmitted to the mobile station from a first other base station that was previously connected via radio to the mobile station, when the mobile station is connected via radio to a second other base station as a result of a handover, then generates a redirection request signal for requesting the first other base station to redirect the first downlink signal to the second other base station, the redirection request signal including identification information identifying the second other base station and packet position information indicating the start position of the packets of the first downlink signal that are yet to be transmitted to the mobile station, and sends the redirection request signal to the first other base station via the interface unit.

5. The base station according to claim 4, wherein while a second downlink signal received from an upper node is being transferred to the second other base station, when a redirection request signal requesting that the second downlink signal be redirected to a third other base station, the control unit performs control to redirect the second downlink signal to the third other base station.

6. A handover execution method for use in a mobile communication system comprising a plurality of base stations, an upper node connected to the plurality of base stations, and a mobile station capable of connecting via radio to any one of the plurality of base stations, wherein
while a first base station of the plurality of base stations that is currently connected via radio to the mobile station is receiving a first downlink signal from a second base station of the plurality of base stations that was previously connected via radio to the mobile station and that received the first downlink signal from the upper node for transmission to the mobile station, when the mobile station is connected via radio to a third base station of the plurality of base stations as a result of a handover, the first base station sends a redirection request signal requesting the second base station to redirect the first downlink signal to the third base station, the redirection request signal including identification information identifying the third base station and packet position information indicating the start position of the packets of the first downlink signal that are yet to be transmitted to the mobile station,
the second base station, in response to the redirection request signal, transfers to the third base station the packets of the first downlink signal starting from the start position indicated by the packet position information, and
the third base station transmits the packets of the first downlink signal to the mobile station.

7. A mobile communication system comprising:
a plurality of base stations;
an upper node connected to the plurality of base stations; and
a mobile station capable of connecting via radio to any one of the plurality of base stations, wherein
while a first base station of the plurality of base stations that is currently connected via radio to the mobile station is receiving a first downlink signal from a second base station of the plurality of base stations that was previously connected via radio to the mobile station and that received the first downlink signal from the upper node for transmission to the mobile station, when the mobile station is connected via radio to a third base station of the plurality of base stations as a result of a handover, the first base station sends a redirection request signal requesting the second base station to redirect the first downlink signal to the third base station, and the second base station, in response to the redirection request signal, redirects the first downlink signal to the third base station, and wherein when the mobile station is connected via radio to the third base station before the first base station transmits at least a portion of a second downlink signal received from the upper node to the mobile station, the first base station transfers at least the portion of the second downlink signal to the third base station, and the third base station transmits at least the portion of the second downlink signal to the mobile station after transmitting the first downlink signal received from the first base station to the mobile station.

* * * * *